(12) United States Patent
Coats et al.

(10) Patent No.: US 10,117,542 B2
(45) Date of Patent: Nov. 6, 2018

(54) COFFEE MAKER

(75) Inventors: Andrew Coats, Somerville, MA (US); Benjamin Salinas, Somerville, MA (US); George Harris, Seattle, WA (US); Robert Macklin, Seattle, WA (US); Carl Tappan, Boxborough, MA (US)

(73) Assignee: Luminaire Coffee LLC, Somerville, MA (US)

( * ) Notice: Subject to any disclaimer, the term of this patent is extended or adjusted under 35 U.S.C. 154(b) by 663 days.

(21) Appl. No.: 13/186,691

(22) Filed: Jul. 20, 2011

(65) Prior Publication Data

US 2013/0019756 A1 Jan. 24, 2013

(51) Int. Cl.
| | |
|---|---|
| *A47J 31/00* | (2006.01) |
| *A47J 31/56* | (2006.01) |
| *A47J 31/04* | (2006.01) |
| *A47J 31/06* | (2006.01) |
| *A47J 31/34* | (2006.01) |

(52) U.S. Cl.
CPC .............. *A47J 31/56* (2013.01); *A47J 31/04* (2013.01); *A47J 31/0631* (2013.01); *A47J 31/0621* (2013.01); *A47J 31/34* (2013.01)

(58) Field of Classification Search
CPC A47J 31/047; A47J 31/34; A47J 31/56; A47J 31/0621; A47J 31/0631
USPC .......... 99/280, 281, 282, 285, 305, 299, 307
See application file for complete search history.

(56) References Cited

U.S. PATENT DOCUMENTS

| | | | | |
|---|---|---|---|---|
| 4,433,617 | A * | 2/1984 | Magnusson | A47J 31/54 99/295 |
| 5,072,660 | A * | 12/1991 | Helbling | 99/280 |
| 5,440,972 | A * | 8/1995 | English | A47J 31/005 99/282 |
| 5,784,531 | A * | 7/1998 | Mann et al. | 392/494 |
| 6,080,971 | A * | 6/2000 | Seitz et al. | 219/483 |
| 6,382,083 | B2 * | 5/2002 | Schmed | A47J 31/0605 99/283 |
| 7,673,556 | B2 * | 3/2010 | Spencer | A47J 31/4403 99/280 |
| 7,856,920 | B2 * | 12/2010 | Schmed | A47J 31/0673 99/289 R |
| 8,132,499 | B2 * | 3/2012 | Lowe | A47J 31/54 222/146.2 |
| 8,800,430 | B2 * | 8/2014 | Bishop | A47J 31/52 426/231 |
| 8,910,563 | B2 * | 12/2014 | Hulett | A23F 5/262 99/280 |
| 2006/0005712 | A1 * | 1/2006 | Greenwald et al. | 99/275 |
| 2007/0047617 | A1 * | 3/2007 | Thorne et al. | 374/163 |
| 2008/0050480 | A1 * | 2/2008 | Doglioni Majer | A47J 31/3609 426/231 |
| 2009/0056011 | A1 * | 3/2009 | Wolf et al. | 4/623 |

(Continued)

*Primary Examiner* — Reginald L Alexander
(74) *Attorney, Agent, or Firm* — Lee Weinstein

(57) ABSTRACT

A coffee maker with continuously adjustable water flow rate, continuously adjustable feedback-controlled water temperature, and low thermal mass allows baristas to experiment with and digitally program and/or record different flow-rate and temperature profiles (brewing profiles) over the course of brewing a cup or batch of coffee. Brewing profiles may be recorded on one machine and reproduced (played back) on another machine, allowing reproducibility of subtle flavor variations in brewed coffee.

7 Claims, 3 Drawing Sheets

(56) References Cited

U.S. PATENT DOCUMENTS

| | | | |
|---|---|---|---|
| 2009/0255408 A1* | 10/2009 | Lassota et al. | 99/282 |
| 2010/0021149 A1* | 1/2010 | Mulder et al. | 392/466 |
| 2010/0166928 A1* | 7/2010 | Stamm | A23F 3/18 |
| | | | 426/435 |
| 2010/0193492 A1* | 8/2010 | Hughes | 219/162 |
| 2010/0236420 A1* | 9/2010 | Remo | A47J 31/0657 |
| | | | 99/299 |
| 2011/0041696 A1* | 2/2011 | Aemisegger et al. | 99/281 |
| 2011/0067418 A1* | 3/2011 | Senn et al. | 62/115 |
| 2011/0097454 A1* | 4/2011 | Coccia | A47J 31/36 |
| | | | 426/231 |
| 2011/0113971 A1* | 5/2011 | Aemisegger et al. | 99/302 R |
| 2012/0219686 A1* | 8/2012 | Bombeck et al. | 426/431 |

* cited by examiner

COFFEE MAKER

FIELD OF THE INVENTION

The field of the invention relates to coffee brewing, coffee makers, and more specifically to coffee makers and high-quality coffee makers used in up-scale coffee houses.

BACKGROUND OF THE INVENTION

Coffee has been a popular drink in the United States for over 100 years. In the 1700's, coffee first found its way to the Americas by means of a French infantry captain who nurtured one small plant on its long journey across the Atlantic. This one plant, transplanted to the Caribbean Island of Martinique, became the predecessor of over 19 million trees on the island within 50 years. It was from this humble beginning that the coffee plant found its way to the rest of the tropical regions of South and Central America.

Coffee production has long been considered a vital part of many national economies. After the Vietnam war, the US helped to stimulate the recovery of the Vietnam economy by supplying farmers with coffee plants to grow. The coffee production of Vietnam subsequently grew so large that it significantly negatively impacted coffee production in South America. Today coffee (in the form of coffee beans) is the second most traded commodity in the world, and coffee production is considered so vital to so many economies that the majority of coffee production in the world is subsidized by governments to allow pricing to be competitive in the world market.

Within the past two decades, "designer" coffees have become more popular. Yearly revenues for up-scale coffee shop such ad Starbucks often exceed $900,000 per shop from the first year, and the Starbucks coffee shops have a total combined revenue greater than $10.7 billion per year. Coffee shops such as Starbucks cater to the up-scale coffee market, where consumers pay handsomely for cups of coffee that deliver subtle variations in flavor which they consider pleasing to the palette, or fashionable, or both.

Coffee (in the form of a drink) is produced by passing hot water through ground coffee beans, so that some of the organic compounds within the coffee beans dissolve into the hot water as it passes through. The process of dissolving organic compounds form coffee beans into water to produce coffee is commonly referred to as brewing. The solubility and stability of the organic compounds which dissolve into the water during the brewing process is temperature-dependent, and thus the flavor and perceived quality of coffee is dependent on the brewing temperature.

Once coffee has been brewed, measuring total dissolved solids (TDS) is one scientific method to measure how "strong" the coffee is. The rate at which these solids (organic compounds) dissolve into the hot water during the brewing process is referred to as the extraction rate.

There are three major classes of coffee-brewing apparatus in use today: home coffee brewers, commercial coffee brewers, and espresso brewers. Home coffee brewers typically heat water to the boiling point in a small chamber, where the periodic rapid expansion of a steam bubble created from boiling water is used to propel small pulses of nearly-boiling water up an open-topped tube. After the nearly-boiling water spurts out of the top of the open-topped tube, the water drips down onto the top of a quantity of coffee grounds contained within a brewing basket. Brewing baskets are designed to allow water to seep down through the grounds and escape through the bottom of the brewing basket, while keeping the grounds contained. Some brewing baskets include micro-fine filters which contain the grounds, and may be cleaned and re-used, while other brewing baskets are designed to be used in conjunction with disposable paper filters, which allow brewed coffee to pass through while containing the grounds. Once brewed coffee has passed through the filter, the brewing process is complete.

Within the coffee industry, the basket containing the grounds and the filter is sometimes referred to as a "brewer", but within this document, the entire coffee-brewing apparatus (including water-heating apparatus, basket, and filter) may be referred to alternately as a brewer, a coffee machine, or a coffee brewer.

The periodic flash-boiling method used to heat and pump the hot water in home coffee makers produces pulses of water of somewhat varying temperature, whose average temperature varies according to the atmospheric pressure at which the brewer is operated. Atmospheric pressure varies with altitude, so the temperature of the hot water these machines produce is dependent on altitude. The boiling point of water varies with dissolved mineral content, so the brewing temperature of these coffee makers also varies with the dissolved mineral content of the water used.

Commercial coffee makers typically use different means than home coffee makers for controlling the temperature of the hot water. Commercial coffee makers typically include a high-thermal-mass reservoir, either in the form of a block of heated metal, or a chamber of heated water, or both. A thermostat is typically used to turn on a heating element when the sensed temperature of the thermal reservoir drops below a preset value, and to turn that heating element off again when the set temperature of the thermal reservoir rises above a another pre-set value. Such thermostats are typically adjusted mechanically, and commercial coffee makers with such thermostatically controlled thermal reservoirs typically produce hot water whose temperature is regulated within plus or minus 5 degrees Celsius. This hot water is passed through a basket of coffee grounds similar to the baskets used in home coffee machines, to produce brewed coffee. An alternate design used in some commercial coffee makers uses a pressure switch in place of a thermostat. When the water within the thermal reservoir approaches the boiling point, its pressure increases, turning off the heating element.

Since the size of commercial coffee makers may be large compared to home units, and since it is desirable for an even flow of water to flow down through the coffee grounds within the basket, some commercial coffee machines use a perforated inverted cone or the like above the coffee grounds to distribute the flow of hot water over the surface of the grounds during the brewing process.

Due to the thermal mass of their internal heat reservoirs, commercial coffee machines often have a substantial initial warm-up time. There is a need for high-quality well thermally regulated coffee brewing machines with a reduced warm-up time.

Not only do the large thermal reservoirs in commercial coffee makers require a substantial amount of time to heat up, but these coffee makers also typically have considerable size and weight, which requires substantial installation space within a coffee shop. There is a need for more compact commercial coffee making equipment which requires less space in coffee shops.

Commercial coffee brewers are sometimes used to brew an entire pot or large batch of coffee, and they are sometimes used to brew individual cups of coffee. When a multi-cup batch of coffee is brewed, a larger basket and more coffee grounds are used than when an individual cup of coffee is brewed. Some commercial brewers are capable of delivering hot water at different pre-programmed rates, and some can be programmed to deliver a certain quantity of water in a certain amount of time (for instance, to brew a single cup, or a 10-cup batch, etc.). Within such brewers, the flow rate is controlled as a pulse-width-modulated series of bursts of hot water, where within each burst, the hot water is delivered at the same fixed rate. The average flow rate (averaged over more than one burst) is varied by alternately turning a valve on and off, where the ratio of on time to off time determines the flow rate, and the maximum flow rate is achieved when the valve is on all the time. By timing the total amount of on time in a series of such on/off bursts, a total desired quantity of water can be dispensed.

The rate at which water is delivered to the grounds in the basket has some effect on the rate at which water moves through the grounds in the basket. For instance, if a significant head of water builds up on top of the grounds, the flow rate through the grounds increases, and this can change the extraction rate in the brewing process.

Since the extraction rate is known to affect the flavor of brewed coffee, there is a need for innovative technologies which allow baristas to experiment with both water temperature and flow rate in innovative ways. At the time of writing of this patent application, brewing parameters are typically communicated between baristas in terms of water temperature, time, and volume. It is anticipated that specification of additional parameters will develop over time.

SUMMARY OF THE INVENTION

It is an object of the present invention to provide a high-quality, well thermally regulated beverage brewing machine (suitable for brewing coffee, tea, etc) with a reduced warm-up time. It is a further object of the present invention to provide a more compact commercial coffee maker which requires less space in coffee shops. It is a further object of the present invention to provide a coffee maker which facilitates baristas experimenting with both water temperature and flow rate in innovative ways.

The present invention combines low-internal-volume, low-thermal-mass plumbing with a microprocessor-controlled flow valve, a heater with a minimal internal thermal mass, flow rate metering, an electronically controlled heating element, and a thermal sensor near the fluid output to provide a coffee maker which can produce a stream of water with a precisely controlled temperature and/or flow rate on demand in seconds. Power delivered to the heating element is controlled by a microprocessor in a feedback system which regulates water output temperature to within one degree Centigrade once the feedback loop has stabilized. In a preferred embodiment, the system has a thermal time constant of about half a second during operation, and a water flow rate of about 240 ml/minute, so output water temperature settles to within 0.5 degrees C. in between 0.5 seconds and 2.5 seconds (or between about 2 ml and 10 ml of water dispensed), depending on how long ago flow was last turned off.

In a preferred embodiment, output temperature and flow rate are continuously controllable either manually on demand, or as a function of time under programmed control, allowing baristas to experiment with different flow and temperature profiles over time to achieve desired variations in brewed coffee flavor. In a preferred embodiment, the system microprocessor can record flow and temperature profiles manually adjusted in real time by someone using the machine over the course of brewing a cup or batch of coffee.

In a preferred embodiment, such recorded flow and temperature profiles (herein referred to as brewing profiles) are digitally stored. This facilitates baristas sharing or selling brewing profiles they have developed.

A preferred embodiment incorporates several safety features. In a preferred embodiment, the heater chamber is pressurized, even at maximum flow rate. This reduces or eliminates undesirable flash-boil points along the surface of the heating element, by allowing water to be heated above what the boiling point would be at ambient atmospheric pressure. In one preferred embodiment, heating is done electrically with a Nichrome wire or ribbon heating element with a positive temperature coefficient. In an alternate preferred embodiment, heating is done by a resistive film deposited on a ceramic substrate. In a preferred embodiment using a film heating element deposited on a ceramic substrate, a thermally conductive ceramic such as aluminum oxide conducts heat from the resistive film to the liquid being heated, and the thermal conductivity of the ceramic helps to reduce the possibility of hot spots developing if a gas bubble forms at a point where heat is being transferred to the liquid being heated. A preferred embodiment incorporates multiple fast-response temperature sensors along the length of the heating element to detect any hot spot that may occur.

In a preferred embodiment, it is desirable to limit the maximum temperature that the heating element reaches. In a preferred embodiment, both the voltage across and the current through the heater element are measured (or one is predetermined and the other is measured), and the temperature of the heating element is sensed through the known relationship between the temperature of the heating element and the resistance of the heating element. In such an embodiment, when it is sensed that the temperature of the heating element has exceeded a pre-determined maximum value, the power being supplied to the heating element is reduced to level small enough that the heating element remains undamaged, yet still sufficient to measure the temperature of the heating element (through its voltage-current relationship).

DETAILED DESCRIPTION OF SOME PREFERRED EMBODIMENTS

Figure 1:
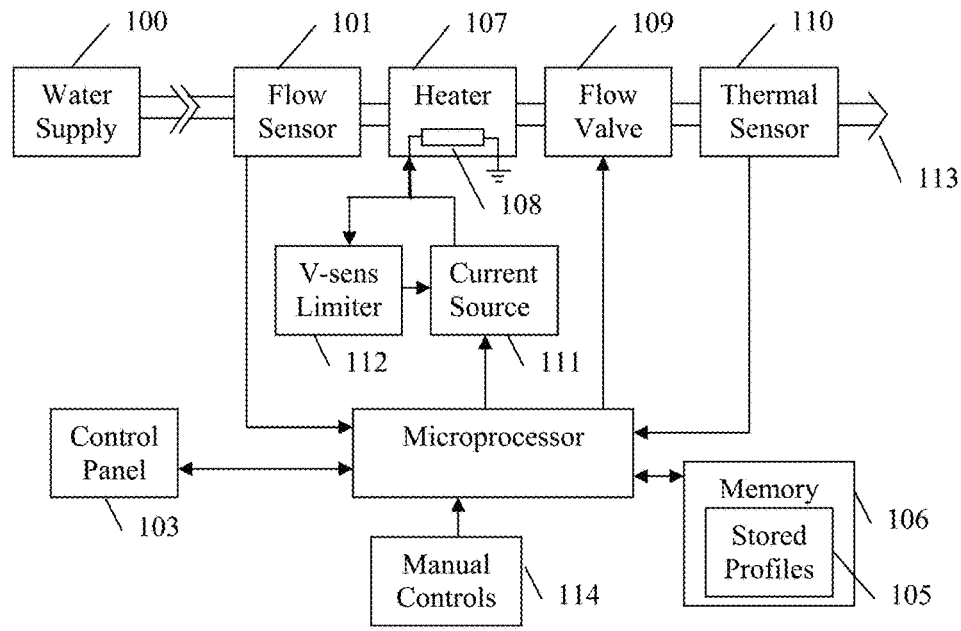
FIG. 1 is a combined fluid/electrical block diagram of a preferred embodiment of the present invention.
Figure 4:
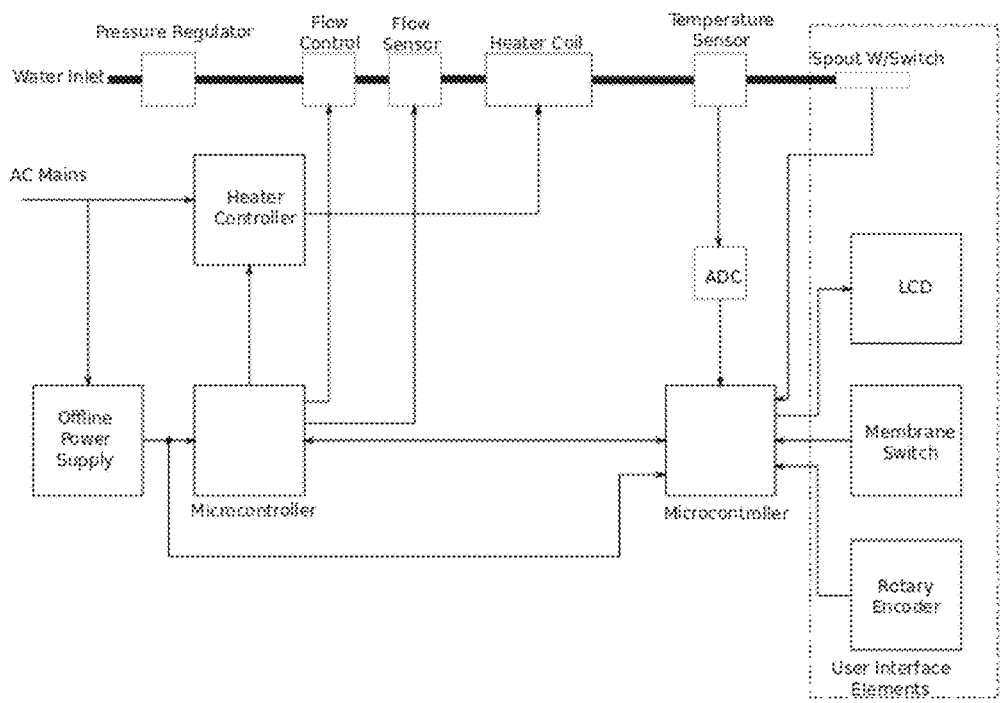
FIG. 4 is a combined fluid/electrical block diagram of an alternate preferred embodiment of the present invention.
Figure 2:
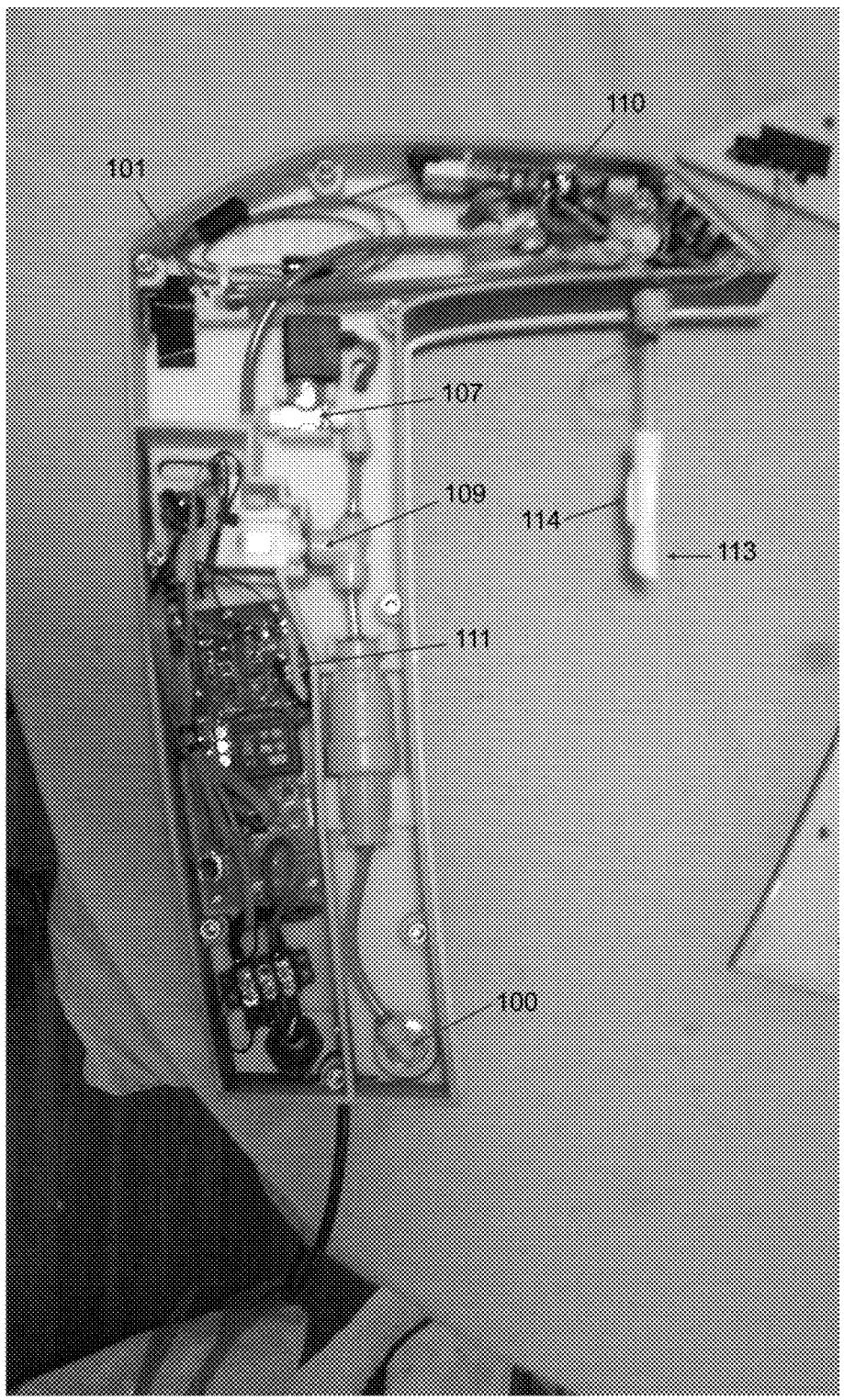
FIG. 2 is a photograph showing the internal circuitry and plumbing of a preferred embodiment of the present invention.
Figure 3:
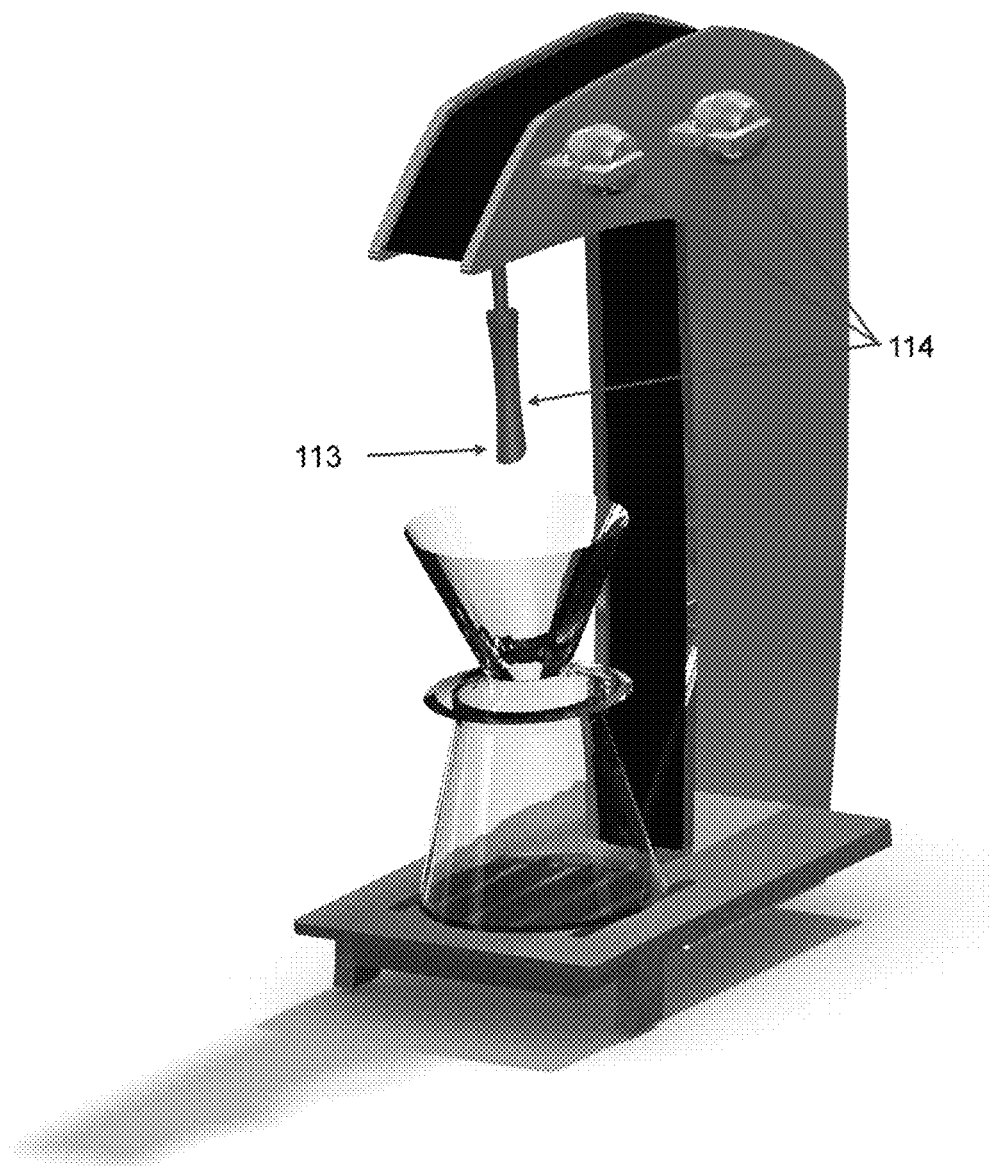
FIG. 3 is a rendering of a preferred embodiment of the present invention.

FIG. 1 is a combined fluid/electrical block diagram of a preferred embodiment of the present invention. Double lines indicate fluid flow, and single lines represent electrical signal flow. Water supply 100 preferably supplies pressure-regulated water, and the flow of water through the present invention is measured by flow sensor 101, in combination with microprocessor 102. Water supply 100 may typically be city water or well water, in some cases supplied through a pre-filter such as a reverse-osmosis filter, activated charcoal filter, sediment filter, some combination of these filters, or the like. In a preferred embodiment, the dissolved gas and mineral content of water coming out of water supply 100 is controlled in a consistent way to help produce coffee with predictable consistent flavor. In a preferred embodiment, dissolved gas and mineral content may be regulated by first purifying water through a reverse osmosis system, and subsequently dissolving desired minerals into the water, and dissolving gases in a pressurized chamber. In order to control the gas and mineral content of the water coming from water supply 100 in a desired way, in some embodiments it may be desirable for the temperature of the water coming from water supply 100 to be cold.

Since dissolved gas and minerals in water take time to come out of solution when water is heated, it has been noted by coffee connoisseurs that the flavor of coffee that is brewed with water that "starts out hot" (meaning it was heated to a pre-brew temperature some time ago and has been sitting for that time) is different than flavor of coffee that is brewed with water that "starts out cold" (is heated to brewing temperature immediately before the brewing process). In a preferred embodiment, thermal time constant of the total heated water volume in the coffee maker is less than one second. The time constant of a first-order feedback system may be thought of as the time the system takes to settle to within 37% of the value of any change it in controlled output it is asked to go through. Equivalently, the time it takes for the system to settle to within 0.7% of a change in output it is asked to go through is 5 time constants. In a preferred embodiment, the thermal time constant of the coffee maker is less than one second and the time the coffee maker requires from power-on until water exiting the coffee maker is within temperature tolerance of the desired brewing temperature is less than five seconds.

Most coffee makers which incorporate heaters may be considered to incorporate temperature-regulated flow-through heating devices which effectively have a thermal time constant (which is a measure of how quickly after power-on the heater stabilizes within an acceptable tolerance at the desired output temperature). Three parameters that influence the thermal time constant are maximum heater output power, maximum water flow rate, and total internal heated water volume (the amount of water contained within the heating chamber plus any plumbing leading from the heating chamber to the output spout). In a preferred embodiment of the present invention, the total internal heated water volume is less than 16 milliliters.

In a preferred embodiment, the temperature sensing means incorporated in the present invention produces an electronic signal which varies monotonically with temperature throughout the temperature range of water expected to pass through the system. Temperature sensing means may be (for example) an RTD (a device whose resistance varies with temperature), a thermocouple, a device with a physical dimension that varies predictably with temperature, a device whose acoustic resonant frequency varies with temperature, a device whose capacitance varies with temperature, etc.

In a preferred embodiment, the means for measuring the flow rate of water through the present invention may be (but is not limited to) a paddle-wheel flow sensor, an acoustic flow sensor, a differential thermal measurement flow sensor, a vane flow sensor, a differential pressure flow sensor, a turbine flow sensor, etc.

In a preferred embodiment, control panel 103 can be set to allow on-the-fly manual control of flow rate and temperature through manual flow and temperature controls 104, or to allow for automatic control by microprocessor 102, under control of stored profiles 105 which are stored in memory 106. New profiles may either be programmed on a personal computer (in which case memory 106 is portable, such as an SD card, or a USB thumb drive or the like), or such profiles may be programmed through control panel 103, or such profiles may be recorded by microprocessor 102 monitoring in real time the manual control of manual controls 104.

In a preferred embodiment, heater 101 is electrically powered, and contains heating element 108, which is preferably a resistive heating element (such as a Nichrome wire or ribbon) with a positive temperature coefficient of resistance. In embodiments where heating element 108 is in direct contact with the water being heated, it is desirable for heater element 108 not to have any direct connection with utility line voltage, and it is desirable for heater element 108 to be made from a metal alloy the atomic constituents of which are all considered nutrient metals (such as iron, chromium, nickel, and magnesium), and not toxic metals such as lead or mercury.

Heating element 108 is powered by microprocessor-controlled current source circuit 111, which is controlled by microprocessor 102. Heater element temperature safety limit circuit 112 monitors the temperature of heater element 108 by monitoring the voltage across heater element 108, and accts to limit the current supplied by current source 111 if the temperature of heater element 108 exceeds a first predetermined value. Safety limit circuit 112 acts in such a manner that under no circumstances can heater element 108 exceed a second predetermined value.

In an alternate embodiment, a simple bi-metallic thermostatic switch may be employed as an overheat safety switch to cut power to heater element 108 if heater element 108 overheats. Such an alternate embodiment may have the advantage of being less expensive, and will also have the disadvantage of being slower to trip, and slower to reset. It may also have the additional disadvantage that if heating element 108 is coated with an insulating layer of a substance such as Teflon, such insulating layer may be damaged during overheat, because the surface temperature of heating element 108 may get substantially higher than normal before a thermostatic safety switch has time to respond and cut power to heater 108.

In a preferred embodiment, microprocessor controlled flow valve 109 is a continuously variable valve, such as a servo-controlled valve, though in some simplified embodiments flow valve 109 may be a simple solenoid valve, or a solenoid valve in series with a continuously adjustable manually controllable valve. In a preferred embodiment, microprocessor 102 acts to control flow valve 109, either in response to manual controls 104 or in response to stored profile data retrieved by microprocessor 102 from memory 106, in response to signals received from control panel 103. In a preferred embodiment, control panel 103 comprises a keypad and a display such as an LCD or LED display or the like. In an alternate preferred embodiment, control panel 103 comprises a touch-sensitive display as is commonly used on mobile phones and the like.

In a preferred embodiment, the majority of flow resistance of the plumbing chain of the present invention (comprising water supply 100, flow sensor 101, heater 107, flow valve 109, thermal sensor 100, and output spout 113) occurs after heater 101, such that the heater 101 is always pressurized and thus water within heater 101 can be heated above what would be the boiling point at atmospheric pressure.

In a preferred embodiment, the heating element 108 is either bare metal (in which case the heating element is preferentially made of an alloy of metals all of which are considered to be nutrients), or coated with a thin non-conducting film *such as ceramic, diamond, or Teflon).

In a preferred embodiment, output spout 113 comprises a flexible tube with a handle, enabling a barista to manually direct the output flow to different locations on a basket of coffee grounds. In a preferred embodiment, output spout 113 is interchangeable such that the flexible tube may be swapped for (for instance) a spreader cone if desired. In a preferred embodiment, means to control water flow rate and/or water temperature may be provided on the spout, so that a barista may control these functions with the same had being used to direct flow. In a preferred embodiment, output spout 113 is extendible, facilitating precise placement of water onto grounds sitting at different heights above the counter top.

Within this document, "mans for heating water" may be construed to include heating by an electrically resistive element; heating by burning a burnable fuel such as gas, oil, alcohol, wood, etc.; heating via microwaves; heating via light (including infrared or sunlight); heating via a gas compression process; heating via heat transfer from a heat reservoir; heating via friction; heating by passing an electrical current through a liquid; or heating via particle bombardment, and all manner of heating commonly known in the art.

Within this document, the term "valve means" may be construed to include manually actuated valves, electrically actuated valves, pneumatically actuated valves, hydraulically actuated valves, by-stable valves, valves that self-close in the event of power loss, or valves that automatically open in the event of power loss, and all manner of valves commonly known in the art.

Within this document, the term "temperature sensing means" may be construed to include thermostats, bimetallic strips, PTAT chips, temperature-dependent resistive elements, thermocouples, infrared spectrum sensors, pyrometers, and all other temperature sensing methods commonly known in the art.

Within this document, the term "temperature controller means" may be construed to include all manner of mechanical, electrical, and software feedback systems and combinations thereof as are commonly known in the art intended to minimize the difference between a controllable temperature and a predetermined temperature.

Within this document, the term "temperature adjustment means" shall be construed to include any mechanically controlled (whether manual or machine controlled), electrically controlled, magnetically controlled, optically controlled, radio controlled, or software-controlled temperature adjustment device.

Within this document, the term "means for measuring the flow rate of water" shall be construed to include propeller or paddle-wheel flow measurement devices, heat transfer flow measurement devices, Doppler flow measurement devices, drag force flow measurement devices, and all other flow measurement devices commonly known in the art.

Within this document, the term "remote valve actuating means" shall be construed to include electrical, magnetic, hydraulic, pneumatic, or mechanical actuation based on any common sensor used to sense manual interaction, including a switch, an electrostatic sensor, a heat sensor, an optical sensor, a capacitive sensor, a pressure sensor, a velocity sensor, and any other sensor known in the art for transducing manual input.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

What is claimed is:

1. A beverage brewer comprising:
   heating means for heating water;
   an output spout where water having passed through said valve means and having been heated by said heating means exits said brewer;
   temperature sensing means capable of sensing at said spout the temperature of water flowing out of said spout, and producing a sensed temperature signal;
   a manually-directable output spout operable to manually direct water output flow to different locations on a basket of coffee grounds; and
   water flow rate control means mounted on said output spout.

2. The beverage brewer of claim 1, wherein said output spout is flexible, allowing the manual directing of water flow to different locations on a brew basket.

3. The beverage brewer of claim 1, wherein said output spout is manually extendable.

4. The beverage brewer of claim 2, wherein said water flow rate control means mounted on said output spout comprise a switch operable to control an electrically actuated valve.

5. The beverage brewer of claim 2, further comprising means for measuring the flow rate of water flowing out said output spout.

6. A beverage brewer comprising:
   heating means for heating water;
   valve means for controlling the flow of water through said beverage brewer;
   an output spout where water having passed through said valve means and having been heated by said heating means exits said brewer;
   temperature sensing means capable of sensing the temperature of water flowing out of said spout, and producing a sensed temperature signal;
   temperature controller means connected to said temperature sensing means, and capable of controlling the amount of heat put out by said heating means, in response to the sensed temperature signal;
   temperature adjustment means allowing an operator to adjust the temperature of water flowing out of said spout dynamically as said water is flowing; and
   water flow rate control means mounted on said output spout.

7. The beverage brewer of claim 6, further comprising means for measuring the flow rate of water flowing out said output spout.

* * * * *